United States Patent Office 2,971,342
Patented Feb. 14, 1961

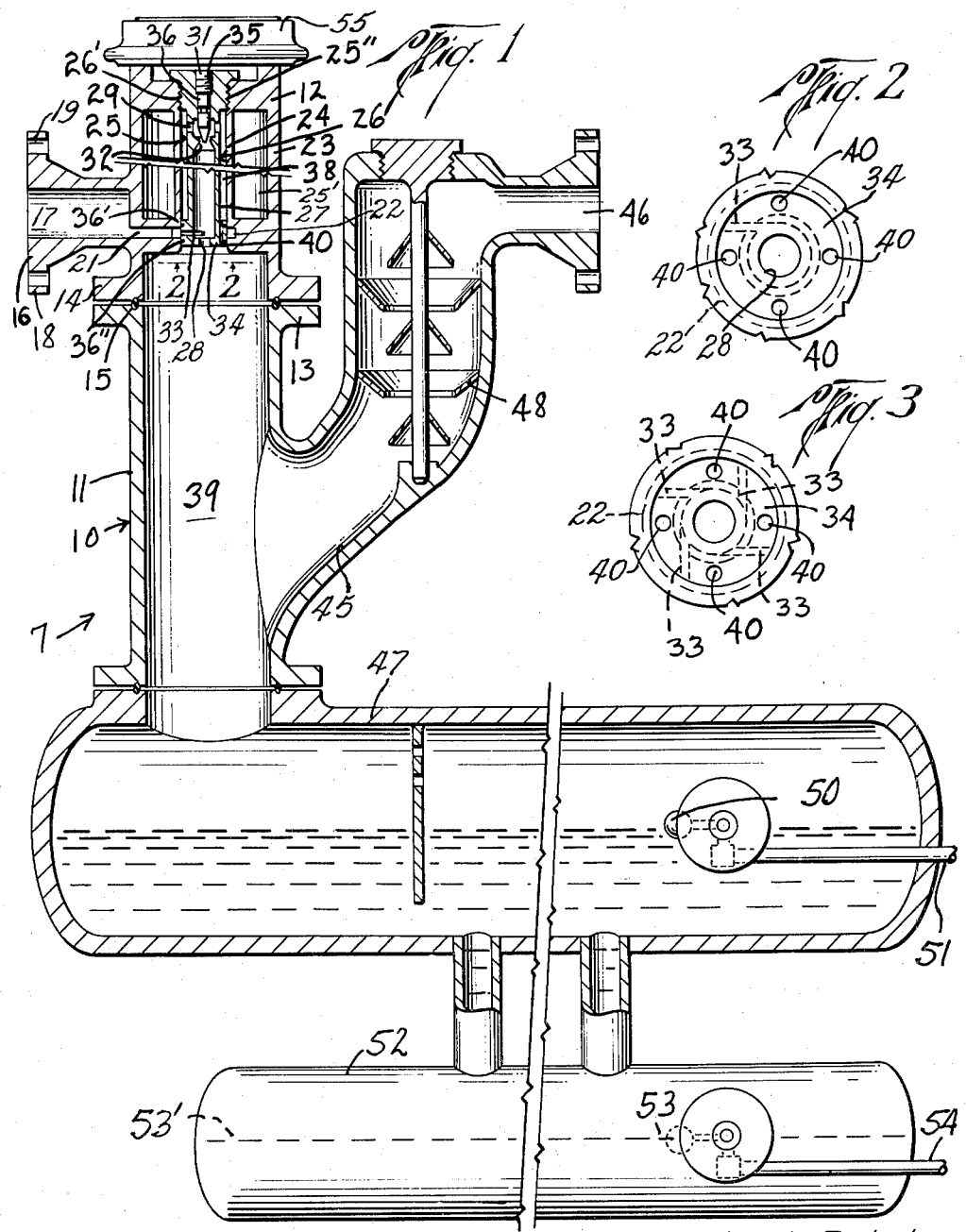

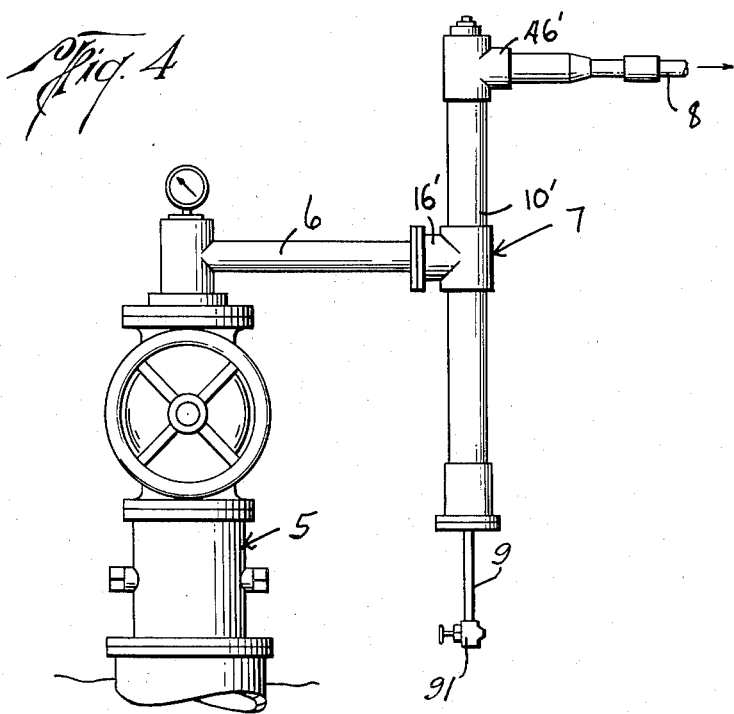
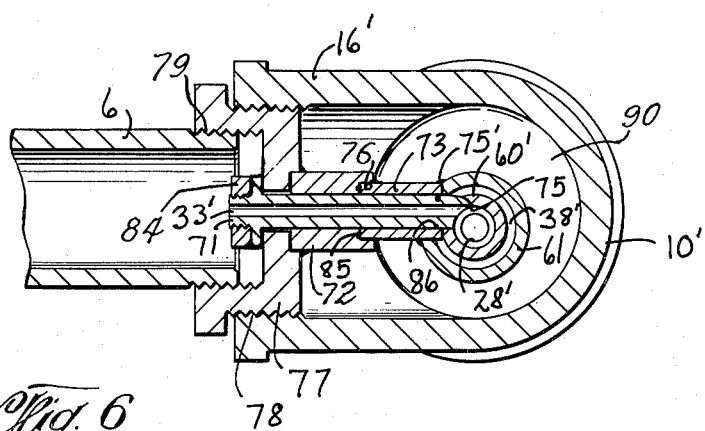

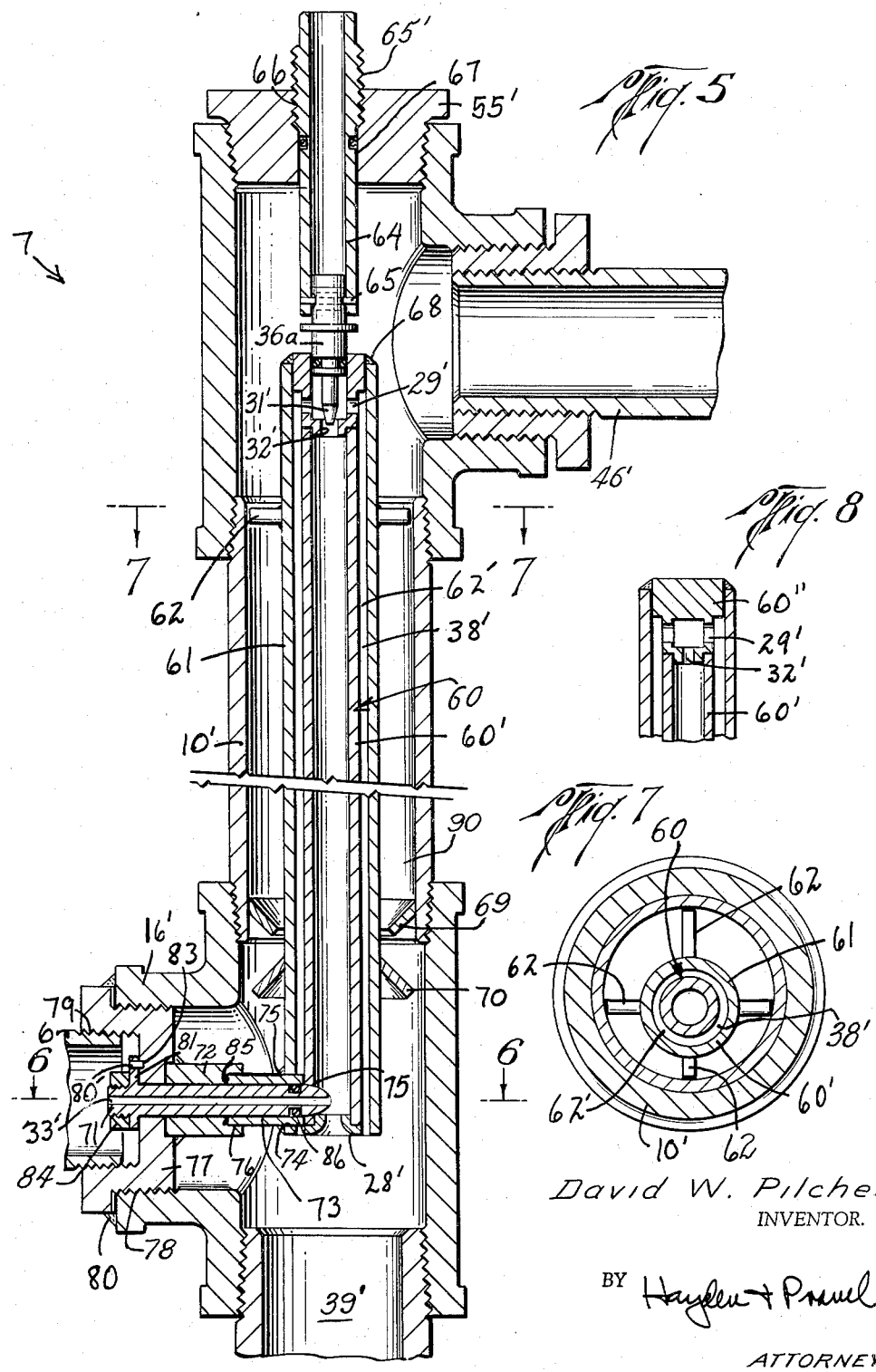

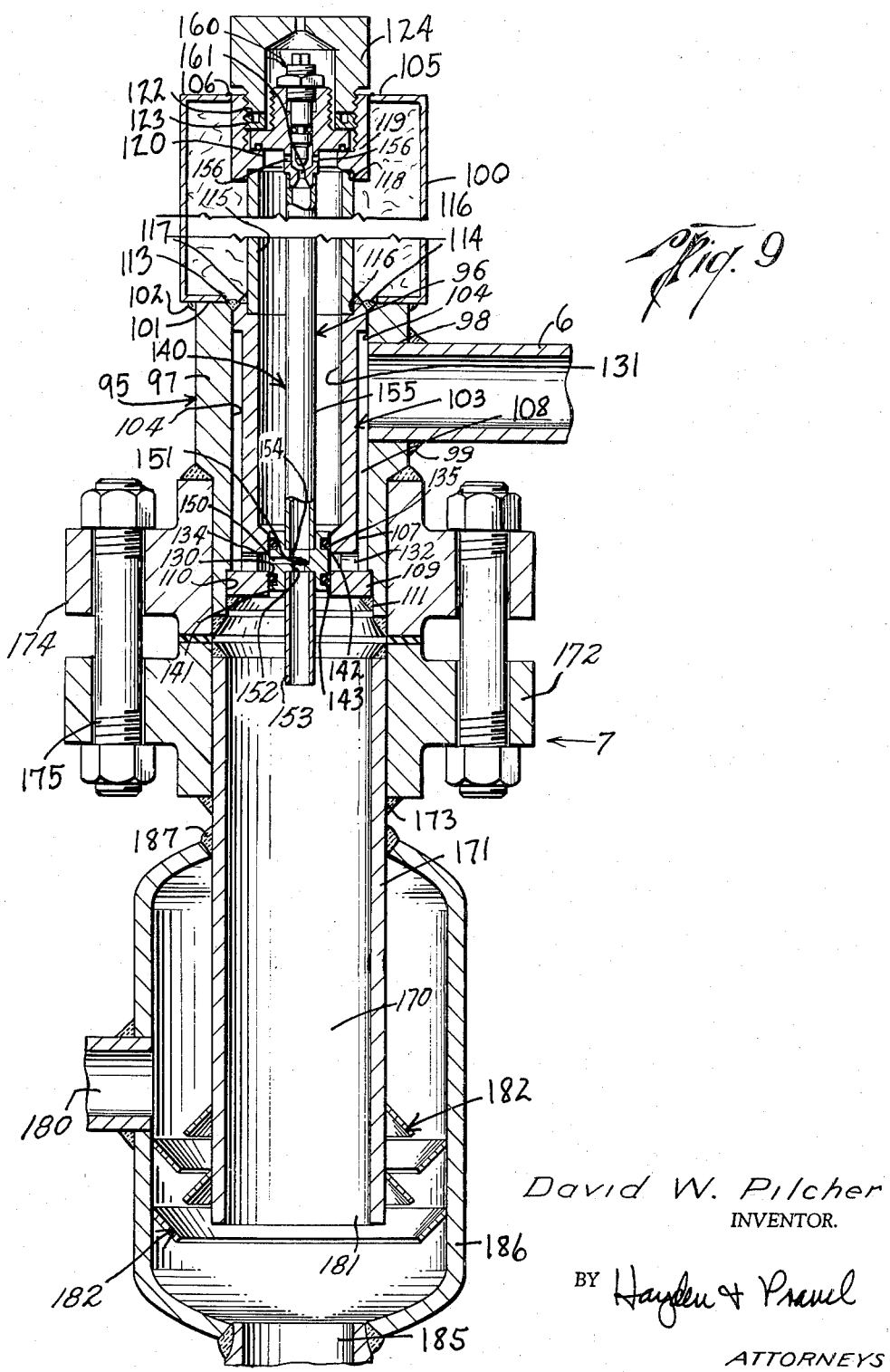

2,971,342

APPARATUS FOR SIMULTANEOUSLY REDUCING THE PRESSURE, DEHYDRATING AND SEPARATING FLUID FLOW

David W. Pilcher, P.O. Box 13124, Houston, Tex.

Filed Jan. 6, 1958, Ser. No. 707,384

2 Claims. (Cl. 62—5)

The present invention relates to apparatus and a process for treating fluid flow and is particularly adaptable for the treatment of flow from oil and gas wells.

In order that the maximum benefit may be obtained from the flow from a gas well having water and liquid hydrocarbons therein, it is desirable to treat the flow so that it is separated into a gas and a liquid portion and to also dehydrate the gas portion of the flow to eliminate certain problems in transmission thereof. Additionally, the pressure of the fluid mixture consisting of a gas portion and a liquid portion must be properly regulated so that the separation can be carried out effectively and so that the gaseous portion may be conducted to transmission lines for subsequent use.

The accepted practice in treating fluid flow from gas wells at the present time requires the provision of a plurality of separate pieces of equipment so that the well fluids consisting of a gas and liquid portion can be stepwise treated to obtain the desired results.

For example, at the present time the flow from gas wells is first conducted to a heater to raise the temperature of the mixture, and after the well fluids have been heated, they are subjected to pressure reduction so that the fluids can be passed to separators for separating certain constituents therefrom. The heating of the well fluid prior to the pressure reduction inhibits the cooling of the well fluids below the point at which condensate would form therein as the pressure of the well fluid is reduced. Also, the heating inhibits the formation of ice in the fluid flow line, which ice formation would restrict the flow through the line, or may even completely close off flow through the line.

After the heating and subsequent pressure reduction as above described, the well fluids are then conducted to what is termed a high-pressure separator in which the condensable constituents of the mixture, normally called "distillate" and the water carried in the well fluids is separated from the gaseous portion of the fluid flow. Thereafter, the gaseous portion of the well flow is discharged from the high-pressure separator and conveyed to gas transmission lines for distribution and use.

The "distillate" and water separated from the well flow is thereafter conveyed to a water knockout wherein the "distillate" is separated from the water and the "distillate" passed to what is termed a low-pressure separator for removal of low-pressure gases from the "distillate." The liquid phase hydrocarbons from the separator are conveyed to a tank for storage and subsequent use. Of course, the water is discharged from the system.

From the foregoing description, it can be readily appreciated that not only is a substantial amount of equipment required to treat the flow from gas wells, but transmission lines between the well head and the separators must be sufficiently strong to withstand the high-pressures normally encountered in the fluid flow. Therefore, the original cost of installations used for treating gas at the present time is extremely great, and the continual operational and maintenance cost of the various pieces of equipment is extremely excessive.

The present invention provides a relatively simple construction which greatly reduces the problems attendant with the foregoing system of well fluid treatment and provides a device and process which is relatively simple in construction, yet efficient in operation.

An object of the present invention is to provide a device for reducing the pressure in a fluid flow stream, which apparatus eliminates the possibility of forming hydrates within the line which might freeze and restrict or close off flow through the line.

Still another object of the present invention is to use a vortex tube, or Hilsch tube type separator to separate fluid flow from a gas well into a hot part and into a cold part, which separator includes a restricted bore communicating the fluid flow to the separator, and means communicating the separated cold part of the fluid with the hot part of the fluid to effect a condensation therein.

Still another object of the present invention is to provide a device for reducing the pressure in the flow line from a well, while simultaneously separating the flow into a hot part and a cold part, and thereafter mixing the hot part and the cold part together to effect condensation, and outlet means associated with the device which reverses the flow of fluid as it is discharged from the device to effect separation of the condensate from the gaseous part of the mixture.

Still another object of the invention is to provide a process of treating a fluid flow stream to simultaneously dehydrate the stream, and to separate the condensable portions from the gaseous portions in the stream.

Other objects and advantages of the present invention will become more readily apparent from a consideration of the following description and drawings wherein:

Fig. 1 illustrates a sectional view, partly in elevation, showing an embodiment of the present invention;

Fig. 2 is a view on the line 2—2 of Fig. 1 showing a portion of the invention;

Fig. 3 is a modification of the invention and illustrates a view of such modification similar to the view shown in Fig. 2;

Fig. 4 is an elevation showing a form of the present invention mounted on a well head;

Fig. 5 is a sectional view showing an alternate embodiment of the present invention;

Fig. 6 is a sectional view on the line 6—6 of Fig. 5 illustrating further details of construction of the form of the invention shown in Fig. 5;

Fig. 7 is a sectional view on the line 7—7 of Fig. 5 showing the manner of mounting the separator of the present invention within the body or support housing;

Fig. 8 is a sectional view illustrating an alternate embodiment of the upper portion of the separator shown in the Fig. 5 modification; and Fig. 9 is a broken sectional view of another alternate embodiment of the separator of the present invention.

Attention is directed to Fig. 4 of the invention wherein a well head is illustrated generally by the numeral 5, such well head being provided with a connection 6 for receiving flow from the well whereby fluids may be conducted from the well to the invention illustrated generally by the numeral 7. The dehydrated gaseous portion of the well fluids may be discharged through the line indicated at 8, while the liquid part of the well fluids may be collected and discharged through the conduit illustrated at 9. The invention is illustrated generally at 7 and may assume a number of forms, three of which are illustrated in the drawings.

Attention is directed to Fig. 1 of the drawings, wherein a form of the invention designated generally by the numeral 7 in Fig. 4 is illustrated in greater detail. In the form of the invention shown in Fig. 1, the apparatus of the invention includes an elongated body designated at 10, which body includes the lower portion 11 and the upper portion 12. The lower portion 11 is provided with a flange 13 and the upper portion 12 is provided with a flange 14 whereby the portions 11 and 12 may be secured together by bolts or the like extending through the flanges 13 and 14 to form the body 10. Suitable seal means as illustrated at 15 may be provided between the flanges 13 and 14 to inhibit leakage of fluid from the body 10 during use of the invention. If desired, the body 10 may be formed from one piece of material instead of the separate sections as shown in the drawings, and the manner of forming the body, whether of sections or whether it is integral, is not critical to the proper functioning of the invention.

A lateral extension 16 on the upper portion 12 of the body 10 is provided with an opening 17 therein and is also provided with a flange 18 on the outer end thereof, so that the body 10 may be secured to the flow line 6 by any suitable means such as bolts or the like extending through the circumferentially spaced openings 19 in the flange 18. When the invention is positioned on the flow line 6, it will assume the relationship relative to the flow line as illustrated in Fig. 4 of the drawings, and it should be noted at this point that the form of the invention shown in Fig. 5 of the drawings has been illustrated in Fig. 4 of the drawings, but that the form of the invention shown in Figs. 1 and 9 would be connected to the flow line 6 to receive flow from the well as shown in Fig. 4 with regard to the form of the invention illustrated in Fig. 5.

The opening 17 in the lateral extension 16 on the body 10 is adapted to communicate with the flow line 6 on the well head 5, for conducting well fluids into the body 10 in the manner, and for a purpose as will be described in more detail hereinafter. The opening 17 may be reduced in size at its inner end as illustrated at 21, and the inner end 21 of the opening 17 communicates with the annular groove 22 formed within the wall 24 in the body 10.

A longitudinally extending bore 25 is provided in the upper portion 11 of the body 10 and is formed by means of the wall 24 which is concentric to the outer wall 23 of the body 10 and spaced relative thereto as shown in Fig. 1 of the drawings. The space 25' between the outer wall 23 and the annular concentric inner wall 24 may be filled with insulation (not shown) if desired. As mentioned previously, the bore 25 extends longitudinally of the body 10 and is adapted to receive the vortex tube type separator, or the Hilsch vortex tube type separator as it is sometimes known, as shown at 26 in Fig. 1 of the drawings. The details of construction of a vortex tube type separator are well known in the art, and in this regard reference is made to the patent to G. J. Ranque, No. 1,592,281, issued on March 27, 1934, which patent shows the details of a form of vortex tube separator. Also, attention is directed to various publications which show the construction of separators of this type, such as for example, the publication of February, 1950, of the American Society of Refrigerating Engineers.

The function of a vortex tube type separator is well known, although the reason for its functioning has not been explained scientifically, and such reason or theories of function form no part of the present invention. Generally speaking, a vortex tube type, or Hilsch tube type separator, functions to separate a gas stream into a hot part and into a cold part. The gaseous medium is conducted into the vortex tube type separator tangentially through a simple nozzle, and the point of entry into the separator 26 is beneath the step of a single spiral turn so as to help obtain rotational symmetry of the fluid in the body 27 of the separator 26. For some unknown reason, the fluid conducted into the separator is thereupon separated into a cold part and to a hot part which may be ejected from the separator, As shown in the drawings, the separator 26 includes an elongated tubular body 27 which is provided with an orifice 28 at one end for discharging the cold portion of the fluid stream from the device and it is provided with an opening 29 at its opposite end for discharging the hot portion of the fluid stream from the separator. A valve 31 is mounted in the body 27 for regulating the opening 32 within the separator. Threads 25" at the top of the longitudinally extending bore 25 are provided for engaging the threads 26' on the separator 26 whereby the separator 26 may be positioned within the bore 25. It will be noted that the separator 26 is of sufficient length so that when it is seated in the bore 25, the enlarged lower end 34 of the body 27 of the separator will be adjacent the groove 22 which is in the lower end of the bore 25. The simple nozzle of the ordinary vortex tube type separator is replaced in the instant invention with a restricted bore 33 which communicates the opening 17 in the extension 16 on body 10 with the separator 26. It will be noted that regardless of the position of the restricted bore 33 relative to the inner end 21 of passageway 17, communication between the passage 17 and restricted bore 33 will occur since the bore 33 is in alignment with the annular groove 22. Also, leakage between the inner end 21 of the passage 17 and the restricted bore 33 in the separator 26 is eliminated by providing seals 36', and 36" in the lower end 34 of the body 27 of the separator 26, which seals are adapted to span the groove 22 to seal off the body 27 and the wall 24 which defines the bore 25. The restricted bore 33 will be of a predetermined size, depending upon the amount or rate of flow desired in the discharge 46.

A cap 55 is adapted to be positioned on the top of the upper portion 12 of the body 10 which closes off the separator 26 from outside interference. Prior to placing the cap 55 on the upper portion 12 of the body 10, it may be desirable or necessary to regulate the valve 31 so as to obtain an optimum temperature differential between the hot part and the cold part of the fluid flow in the invention. To accomplish this function, threads 35 are provided on the valve stem 36 of the valve 31, whereby the valve stem 36 may be moved longitudinally by rotation thereof so as to increase or decrease the amount of the opening 32. The temperature differential between the hot part of the fluid flow ejected through the port 29 and the cold part of the fluid flow discharged from the orifice 28 may be regulated by positioning the valve 31 so as to regulate the size of the opening 32. After this setting has been made for a particular well installation, the cap 55 may be positioned on the device and the functioning of the device thereafter continued without interruption. Occasionally, it may be desirable from time to time to reset the valve 31 so as to obtain the desired temperature differential in the fluid flowing through the separator, and this can, of course, be readily accomplished by merely removing the cap 55 and positioning the valve 31 to obtain the desired differential.

It will be further noted that the longitudinally extending bore 25 is larger in diameter than the body 27 of the separator 26, thereby defining an annular passageway 38 when the separator 26 is positioned within the bore 25, which passageway serves as a means for communicating the discharge ports 29 in the separator body 27 with the chamber 39 in the lower section 11 of the body 10. A plurality of circumferentially spaced passages 40, as more clearly illustrated in Figs. 2 and 3 are provided in the enlarged lower end 34 of the separator body 27, whereby the hot gas portions discharged through the port 29 and into the passageway 38 may be re-mixed with the cold part of the gas flow in the chamber 39.

When the vortex tube type separator is positioned within the body 10 as shown in Fig. 1 of the drawings, flow from the well will occur through the flow line 6 and into the lateral extension 16. Such flow will be conducted through the opening 17, through the inner end 21 thereof, and into the annular groove 22 within the body 10. Such fluid will be then conducted through the restricted bore 33 in the lower end 34 of separator body 27 and thereafter discharged tangentially into the interior of the separator 26. As previously mentioned, the restricted bore 33 will be of a particular size so as to effect a desired pressure reduction in the flow as it passes through the device, so that the pressure in the discharge side of the body 10 will be at a predetermined amount.

When the fluid from the well is discharged into the separator 26 as above described, it will separate into a cold part which is discharged through the orifice 28 and into a hot part which is discharged through the ports 29. The cold part of the fluid flow from the well is discharged directly into the chamber 39 within the body 10, whereas the hot part of the fluid flow from the well will be discharged through the ports 29 and into the annular passageway 38 surrounding the longitudinally extending body 27 of the separator 26. The hot portion will thereupon be conducted through the passageway 38 to be discharged through the circumferentially arranged ports 40 in the lower end 34 of the body 27 to co-mingle or mix with the previously separated cold portion of the fluid flow.

Since the hot portion of the gas surrounds the separator along the entire length of the "hot" leg, and particularly is discharged through the enlarged end in which the restricted bore is mounted, it should be obvious that warming the body of the separator and particularly the enlarged end where the restricted bore 33 is positioned is effected. The continual warming of the body in which the restricted bore 33 is positioned inhibits the formation of ice within the restricted bore and thereby eliminates the problem of ice formation in the restricted bore and the subsequent restriction or shutting off flow which has occurred with chokes or pressure reducing devices of the prior art.

Additionally, the mixing of the cold part of the flow, and the hot part of the flow in the chamber 39 effects condensation within the mixture in the chamber 39. The condensate formed in the mixture includes the condensable hydrocarbons at the pressures and temperatures existing within the chamber 39, as well as water vapor present in the fluid flow.

In order to separate the condensate from the gaseous portion of the well flow, the outlet means 45 is connected to the body 10 so that the direction of flow of the gaseous portion of the fluid is reversed as it leaves the housing 10. Thus, as shown in Fig. 1 of the drawings, the flow from the separator 26 is downwardly into chamber 39 and it will be noted that the outlet 45 reverses the flow and causes the gaseous portion to be moved upwardly, which movement tends to separate the gas portion of the fluid from the liquid portion of the fluid. To further aid in separating the liquid from the gases, baffle means as illustrated at 48 may be provided in the outlet means 45, the baffle means 48 functioning so that the gaseous portion of the fluid impinges thereagainst as it passes through the outlet means 45, and the direction of flow of the gaseous portion is thereby reversed to further aid in separation.

The condensed portions of the fluid flow are collected in the housing 47 secured to the lower end of the body 10 with which the lower end of chamber 39 communicates.

The constituents in the condensate formed in chamber 39 will be hydrocarbons condensable at the pressures and temperatures existing in the chamber 39 and water. The hydrocarbons will float on top of the water and, if desired, suitable means as illustrated in the form of a float valve arrangement at 50 may be provided in the housing 47, whereby the hydrocarbons may be discharged through the conduit 51 when the level in the housing 47 reaches a predetermined point. As shown, a second housing 52 is connected to the lower portion of housing 47 so that it will serve as an additional storage for the water and condensable hydrocarbons. The interface between the hydrocarbons and the water is illustrated at 53' and, if desired, suitable means such as the float valve arrangement shown at 53 may be provided so that water can be ejected through the conduit 54 to maintain the desired level within the housing 52.

From the foregoing description, it can be readily appreciated that the flow which was originally introduced into the opening 17 has now been separated into the gaseous portion which is discharged through the outlet 46 at a desired flow rate. The gaseous portion discharged through the outlet 46 is dehydrated and has separated therefrom the recoverable hydrocarbons which are condensable at the pressure and temperature existing within the chamber 39.

The liquid portion of the flow is collected in the chamber 47 and the chamber 52 and thereafter discharged for use or disposal as previously described.

The construction of the separator 26 and its arrangement within the body 10, as well as its relationship to the body 10 and the chamber 39 in the body 10 is such that flow from the well is reduced in pressure to a desired point, it is dehydrated, and the constituents thereof are separated into a liquid and gas phase. Furthermore, the pressure reduction has been effected without inhibiting flow through the line, or restricting flow through the line, since the hot part of the fluid separated in the separator 26 is conducted along the separator and discharged around the end 34 of separator 26 to inhibit hydrate formation within the restricted orifice 33.

For example, if the flow in the line 6 from the well is 175,000 cubic feet per day and it is desired to restrict this quantity so that only 165,000 cubic feet per day is discharged from outlet 46, then the restricted bore 33 will be of a size to accomplish this reduction in flow. Similarly, any other flow rate can be effected by providing a suitable size restricted orifice within the separator 26.

In Fig. 2 of the drawings, the lower end 34 of the separator 26 is shown in elevation, and the arrangement of the circumferentially disposed ports 40 therein is illustrated. It will be noted that the restricted bore 33 communicates with the interior of the separator 26 on a tangent so as to conduct flow from the flow line 6 interiorly of the separator 26 tangentially to effect separation thereof into a cold part to be ejected through the orifice 28 and a hot part to be ejected through the ports 29 at the other end of the separator.

In some instances it may be desirable to provide a plurality of restricted orifices 33, and this is illustrated in Fig. 3 of the drawings. It will be noted that each of the orifices 33 communicates with the interior of the separator 26 so that fluid is conducted thereinto tangentially. The ports 40 may be arranged in the enlarged lower end 34 as shown in Fig. 3 of the drawings so as to not interfere with communication of the restricted bores 33 with the inner end 21 of the passage 17. The annular groove 22 communicates each of the bores 33 for passage of fluid therethrough to the interior of the separator 26.

As previously mentioned, the valve stem 36 of the valve 31 is threaded as shown at 35 so that it may be moved longitudinally to increase or decrease the size of the opening 32 in order to obtain the particular operating conditions desired by the separator 26. After the separator 26 has been inserted within the bore 25 of the body 10 of the present invention, it may be necessary or desirable to adjust the valve 31 in order to obtain the maximum desirable operating conditions with the separator to as to obtain the optimum cold and optimum hot temperatures in the hot and cold portions of the fluid flow. After the valve 31 has been adjusted, the cap 55 can be placed on the body 10 to close off the separator 26 from outside interference. Of course, should it become necessary to change the separator 26 or to remove or repair it for any reason, access may be had thereto merely by removing the top 55 from the upper portion 12 of the body 10, whereupon the separator 26 may be removed from the bore 25 merely by rotating it to disengage the threads 25" and 26'.

From the foregoing discussion it can be readily appreciated that the invention as shown in Fig. 1 may be used to not only reduce the pressure in a gas stream or a fluid flow line without the fear of forming ice therein which would otherwise restrict the flow in the flow line, but the invention can also be used to separate the flow into a hot part and into a cold part so that upon mixing of the two parts condensation will form therein, whereby the condensate and gaseous portion of the flow can be separated and ejected from the device.

In Fig. 5 an alternate modification of the invention is illustrated, the body of the device being respresented by the numeral 10' which is adapted to receive the separator designated generally by the numeral 60, which separator is of the vortex tube or Hilsch tube type as previously described with regard to the Fig. 1 modification.

A tubular member 61 extends longitudinally of the body 10' and is arranged therein by means of the laterally extending circumferentially spaced members 62 which connect between the body 10' and the tubular member 61. The elongated tubular body 61 defines a bore 62' for receiving the separator 60 therein. The separator 60 has a body 60' which is provided with an orifice 28' for discharging the cold part of the fluid flow therefrom and is also provided with outlet ports 29' in the opposite end thereof for discharging the hot part of the fluid flow from the separator 60. A valve 31' is provided for regulating the opening 32' in the separator 60, the function of which valve and opening is similar to that as described with regard to the Fig. 1 modification of the invention.

In the Fig. 5 modification of the invention, the valve 31' may be adjusted externally of the housing and to this end a member 64 extends through the cap 55' in the top of the body 10'. The member 64 is engaged with the valve stem 36a by means of the pin 65 which extends through the top of the stem 36a and into an opening in opposite side walls of the member 64. Threads 65' are provided on the outer periphery of the member 64 and are adapted to engage with the threads 66 in the bore 67 extending through the cap 55'. When the member 64 is rotated by means of a wrench or the like, the stem 36a is rotated so as to adjust the valve 31' relative to the opening 32' to increase or decrease the size of the opening so as to obtain the temperature differential between the cold part and the hot part of the fluid flow stream within the separator as described with regard to the Fig. 1 modification.

In the Fig. 5 form of the invention, the restricted orifice represented by the numeral 33' is separated from the separator 60 and the details of construction of the orifice 33' and its relationship to the separator 60 is shown in detail in Figs. 5 and 6 of the drawings. In assembling the Fig. 5 form of the invention, the tubular member 61 is, first of all, positioned within the body 10' by means of the laterally extending circumferentially arranged spacers 62. The separator 60 comprising the elongated tubular member 60' with the orifice 28' and the port 29' in the opposite ends thereof is positioned within the tubular member 61. In order to position the separator 60 in position in the tubular member 61, suitable means such as welds 68 may be provided. The cap 55' may then be positioned on the upper end of the body 10' whereupon the valve 31' may be adjusted by rotating the element 64 in order to obtain the desired setting in opening 32'. If desired, the setting of the valve 31' may be delayed until the device has been completely assembled as will be described in more detail hereinafter.

The baffle 69 may be arranged in the body 10' prior to the time that the tubular member 61 is positioned therein, and similarly, the baffle 70 may be provided on the tubular member 61 prior to the time that the member 61 is inserted in the body 10'. It will be noted that the body 10' is illustrated as being formed of a plurality of sections which are threadedly connected together for ease of assembly.

After the member 61 has been positioned within the body 10' and the tubular body 60' positioned within the member 61, the restricted bore 33' may then be positioned relative to the elongated body 60' of the separator 60. It will be noted that the restricted bore 33' extends longitudinally through the member 71. The member 71 extends through the tubular members 72 and 73. The member 73 is positioned in the opening 74 of the tubular body 61 and adjacent the opening 75 in the elongated separator body 60'. Thereafter, the member 73 may be welded in position on the body 60' by suitable means such as the welds 75'. The body 72 is provided with a counterbore 76 for slidably receiving the member 73 therein, and the body 72 is in turn secured to the closure cap 77 as shown in Figs. 5 and 6 of the drawings. The closure cap 77 is threaded as shown at 78 for securing it on the lateral extension 16' of the body 10' and is provided with a threaded recess bore 79 for securing to the flow line 6. If desired, the closure cap 77 may be secured to the lateral extension 16' by additional means such as welds 80 after it has been positioned in the lateral extension 16'.

As previously mentioned, the restricted bore 33' extends through the member 71 and the member 71 in turn extends through each of the members 72 and 73 and terminates adjacent the separator body 60' so that fluids may be conducted from the flow line 6 through the restricted bore 33' and into the separator for separation into a cold part and into a hot part as described previously with regard to the Fig. 1 modification. It is further noted, from Fig. 6 of the drawings, that the member 71 must be positioned properly relative to the body 60' and to this end a pin 80' is provided in the flange 81 on the outer end of the member 71, which pin is adapted to engage in the recess 83 in the closure cap 77. The recess 83 is aligned properly relative to the elongated body 60' so that when the pin 80' is moved into the recess, the member 71 is properly rotated so that it will seat adjacent the body 60' of the separator 60. A nut 84 can be threadedly engaged with the outer end of the member 71 to move the member easily so that pin 80' fits into opening 83.

In order to inhibit leakage of fluid from the restricted orifice 33', suitable seals are provided as illustrated at 85 and 86.

It will be noted that the diameter of the tubular member 61 is greater than the diameter of the body 60' of the separator 60 so that a passageway 38' is formed for conducting the hot part of the fluid stream back into the chamber 39' of the body 10 in a manner as described previously with regard to the Fig. 1 modification. After the fluids have been mixed in the chamber 39', the flow of the gaseous portion thereof is reversed and passes up through the annular passage 90 around the tubular member 61 to be discharged through the discharge connection 46'. The liquids in the fluid flow may be collected in the lower end of the chamber 39' and discharged by means of the valve means 91 in Fig. 4 of the invention.

In some situations it may be desirable to provide an opening 32' of fixed size and Fig. 8 illustrates a modified form of the invention for accomplishing this result. In Fig. 8 it will be noted that the valve 31' of the Fig. 5 modification has been eliminated and the top 60" of the elongated body has been closed off. The opening 32' will be of a desired size to obtain the temperature differential and operating conditions desired by the separator 60. The ports 29' will be arranged in the body 60' of the Fig. 8 modification as described previously with regard to the Fig. 5 modification.

The function and operation of the Fig. 5 modification is identical to that described with regard to the Fig. 1 modification. It will be noted that the arrangement of the valve 31' is slightly different, as is the arrangement of the restricted bore 33'. Also, the manner of discharge on the outlet side is slightly different from that described with regard to the Fig. 1 modification, but the structure is for accomplishing similar results.

Fig. 9 of the drawings illustrates still another alternate embodiment of the invention. The invention is illustrated generally at 7 in Fig. 9 and is shown as including a body represented generally by the numeral 95 in which is adapted to be received the separator designated generally at 96. The intermediate part 97 of the body is provided with an opening 98 in which is adapted to be received the flow line 6, the flow line 6 being secured to the intermediate body portion 97 by any suitable means such as welds 99 or the like. The upper part 100 of the body 95 is secured to the top 101 of the intermediate body part 97 by suitable means such as the welds 102.

The body 95 is provided with an inner wall designated generally by the numeral 103 which extends longitudinally of the body 95 through the bore 104 in the intermediate body part 97 and is connected at its upper end to the top 105 of the upper part 100 of the body 95 by suitable means such as welds 106. The inner wall 103 may be concentrically disposed within the bore 104 of the intermediate body portion 97 and provides a receptacle for receiving the separator 96 as shown in Fig. 9 of the drawings.

As further illustrated in Fig. 9 of the drawings the annular inner wall 103 is defined by a tubular member or portion 107 fitting within the intermediate body portion 97 and is smaller in diameter than the bore 104 thereby providing the annular space 108 between the member 107 and inner periphery of the bore 104 which space provides a means for conducting fluid from the flow line 6 into the body 95 for communication to the separator 96. The portion 97 is provided with a closed lower end 109 which is adapted to seat in the counter-bore 110 at the lower end of the body portion 97 and may be held in such position by suitable means such as the welds 111. Also, the opposite end of the portion 107 is closed off by the enlarged outer end 113 which fits closely within bore 104 and is secured to the intermediate body part 97 by means of the welds 114.

The wall 103 also includes the member 115 which is seated in the bore 116 at the upper end of the annular member 107 and is secured thereto by suitable means such as the welds 117. The member 115 extends upwardly into the upper port body part 100 and terminates in the counter-bore 118 of the coupling or adapter 119 which adapter forms the top part of the inner annular wall 103.

The coupling 119 is welded as shown at 106 to the upper part or top part 100 of the body 95 and is provided with the bore 120 at the inner end thereof whereby the separator 96 may be inserted through the coupling 119, to extend through the member 115 and the member 107 to assume the position shown in Fig. 9 of the drawings. Suitable threaded means as shown at 122 are provided on the coupling 119 whereby the lock nut 123 may be secured against the top of the separator 96 which rests on the shoulder around bore 120 for retaining the separator in position. Thereafter the cap 124 may be threaded into position as shown in Fig. 9 of the drawings and seated on the lock nut 123 to protect the separator 96 during operation of the invention.

The member 107 in the intermediate body portion 97 includes a bore 130 extending through the lower enlarged end thereof, which bore is smaller in diameter than the internal bore 131 within the member 107 and through which the separator 96 extends.

Laterally extending passages 132 through the member 107 communicate with the bore 130 and with the annular space 108 in the intermediate body portion 97 whereby fluids from the flow line 6 may be conducted from the flow line 6 into the body 95 and then into the separator 96 when it is seated in position in the body 95 as illustrated in Fig. 9 of the drawings.

An annular groove 134 is provided on the periphery 135 of the bore 130 and intersects the passages 132 in member 107 which groove is similar in function and construction to the groove 22 as shown in Figs. 1, 2 and 3 of the drawings.

When fluid is conducted from the flow line 6, it will pass into the annular passage 108 and then into the lateral passages or ports 132 at the lower end of member 107 and into the annular groove 134, whereupon the fluid will then be conducted into the separator 96.

The separator 96 includes an elongated body represented generally at 140 which is adapted to extend longitudinally of the body 95 as shown in Fig. 9 of the drawings. An enlargement 141 is provided on the elongated tubular body 140 of the separator, which enlargement is similar in function and construction to the enlargement 34 shown in the Fig. 1 modification. The enlargement 141 is provided with spaced seals 142 and 143 which are adapted to span the annular passage 134 and to seat and seal the enlargement 141 in the bore 130. As shown in the drawings of Fig. 9, the enlargement 141 is a separate member which is secured to the other components of the body 140 whereas in the Fig. 1 modification the enlargement 34 is shown as being integrally formed with the remainder of the separator 26 illustrated in the Fig. 1 modification.

It should be appreciated that the structural details of the separator may vary slightly as exemplified by the differences between the Fig. 1 and Fig. 9 modification without departing from the scope of the present invention.

The enlargement 141 includes the laterally extending orifice 150 which communicates with the annular groove 134, and the restricted orifice 150 serves as a means for communicating the fluid from the flow line 6 into the separator 96. The restricted orifice 150 communicates with the bore 151 extending longitudinally of the enlargement 141 and passes the gas into the bore 151 on a tangent as previously described with regard to the other modifications of the vortex tube type separator as described herein. The bore 151 is provided with a reduced port 152 at one end thereof whereby cold fluids separated from the well flow may be ejected therethrough and into the tube 153 connected to the enlargement and extending downwardly therefrom as shown in Fig. 9 of the drawings.

The opposite end of the bore 151 is somewhat enlarged as shown at 154 and communicates with the elongated tubular member 155 connected therewith whereby the hot portions of the vortex tube type separator may be conducted upwardly through the tube 155 to be discharged through the port means 156 at the top thereof. Valve means as represented generally by the numeral 160 may be provided in the top of the separator for regulating the amount of opening 161, which valve is similar in construction and function to the valve 31 described with regard to the Fig. 1 modification.

Although not shown in Fig. 9, the enlargement 141 will be provided with ports 40 extending therethrough so that the hot gases discharged through the port means 156 at the top of the separator 96 will be conducted through the bore 131 surrounding the tubular part 155 of the separator 96 to be discharged through the enlargement and into the chamber 170 below the tube 153 through which the cold gases are being discharged.

In some situations it may be desirable to vary length of the tubular member 153 communicating with the cold gases to aid in obtaining a better efficiency of the separator unit. The chamber 170 is formed within the annular member 171 which is connected at its upper end to the flange 172 by suitable means such as welds 173 or the like. The flange 172 is in turn secured to the adjacent flange 174 mounted on the body part 97 by suitable means such as the circumferentially spaced bolts 175 extending through the flanges 172 and 174.

The function and operation of the Fig. 9 modification is similar to that described with regard to the Fig. 1 and the Fig. 5 modification; however, in the Fig. 9 modification it will be noted that the flow line 6 injects the gas into the body 95 at a point between the top and the bottom of the separator 96 and the dehydrated separated gases are discharged at the bottom of the unit through the discharge line 180.

In the chamber 170 the previously separated hot and cold portions of the gases are remixed whereupon condensation is effected and the gas is discharged through the open end 181 of the member 171 whereupon the direction of the flow is reversed to gain access to the discharge opening or connection 180. Suitable baffle means as represented generally by the numeral 182 are provided for further reversing the flow of the gases as they are discharged from the unit to aid in further separation of the condensed water and hydrocarbons from the gases. The condensate including liquid hydrocarbons and the water is discharged through the opening 185 in the lower end of the member 186 which surrounds the tubular member 170 and is connected thereto by suitable means such as welds 187 as shown in Fig. 9 of the drawings. After the liquids are discharged through the opening 185 they may be passed to an arrangement similar to that shown in Fig. 1 for separation of the water from the hydrocarbons. The dehydrated gas is discharged through the line 180.

From the above, it can be appreciated that the function of the modification shown in Fig. 9 is similar to that described with regard to the other forms of the invention described herein.

The invention has been described in detail as applied to the separation of well fluids into a gaseous and liquid portion, but it should be appreciated that the invention could be used in any situation where it is desired to effectively reduce the pressure, dehydrate and separate the components of the fluid stream into a gaseous portion and into a liquid portion.

Since the present invention eliminates the necessity of heating the flow by means previously used and eliminates the necessity of conducting the flow from a well to a plurality of separate systems under high pressure, it is readily obvious that the heater can be eliminated and also the high-pressure lines which heretofore have been used for communicating the well head to the heaters and separators. The present invention may be attached directly at the well head to obtain the desired pressure reduction in the fluid flow while also obtaining the desired separation and dehydration of the constituents in the fluid flow.

Broadly the invention relates to an apparatus and to a process for treating fluid flow wherein the pressure of the fluid may be reduced, the fluid dehydrated and the dry gas separated from the liquid components of the fluid stream.

What is claimed is:

1. A device for dehydrating, reducing the pressure, and separating entrained liquids in fluid flow including an elongated body having a lateral opening for receiving fluid flow, a vortex tube type separator positioned within said body and extending longitudinally thereof, a restricted bore communicating said lateral opening with said separator whereby fluid flow may be conducted through said bore to reduce the pressure thereof and thereafter introduced into said separator for separating the fluid flow into a cold part and a hot part, said separator including openings for separately discharging said separated cold and hot parts therefrom, means communicating with said separator at said hot discharge for conducting said hot discharge in contact with and exteriorly of said separator throughout its length whereby said hot part is ejected adjacent said cold discharge to mix the separated parts together, and means connected with said housing for separating liquids from the mixture of hot and cold fluid flow.

2. The combination recited in claim 1 including a housing connected to said body to receive the condensate separated from the well flow.

References Cited in the file of this patent

UNITED STATES PATENTS

| | | |
|---|---|---|
| 2,650,582 | Green | Sept. 1, 1953 |
| 2,683,972 | Atkinson | July 20, 1954 |
| 2,894,371 | Auer et al. | July 14, 1959 |

FOREIGN PATENTS

| | | |
|---|---|---|
| 858,260 | Germany | Dec. 4, 1952 |